UNITED STATES PATENT OFFICE.

EMIL FISCHER, OF BERLIN, GERMANY, ASSIGNOR TO FARBENFABRIKEN OF ELBERFELD CO., OF NEW YORK, N. Y., A CORPORATION OF NEW YORK.

IODIN PREPARATION.

No. 839,569.    Specification of Letters Patent.    Patented Dec. 25, 1906.

Application filed December 16, 1905. Serial No. 292,053.

*To all whom it may concern:*

Be it known that I, EMIL FISCHER, professor of chemistry, residing at Hessische-strasse No. 2, Berlin, Germany, (assignor to the Farbenfabriken of Elberfeld Co., of New York,) have invented a new and useful Improvement in Iodin Preparations; and I hereby declare the following to be a clear and exact description of my invention.

In order to produce the therapeutic effect of iodin in the human system, potassium iodid has been mostly used. This substance, however, is known to produce frequently symptoms for which the medical term "iodism" is applied. These symptoms are sore throat and eyes, nausea, eczema, and the like. Again, potassium iodid has a peculiar taste against which many patients rebel. The hitherto-known therapeutic substitutes for potassium iodid are mostly oils possessing a disagreeable taste.

My new preparations which I have obtained by the action of hydrogen iodid on high molecular acids of the oleic series—such as oleic acid, erucic acid, brassidic acid, elaidic acid, or the like—and by the transformation of the free acids into their salts distinguish themselves by being solid substances which have no taste. Clinical experience has shown that the symptoms of iodism are very rarely observed in their administration and that iodin in my preparations acts much more effectively than in the form of potassium iodid.

For the production of my new bodies the iodin-substituted acids obtained by the action of hydrogen iodid dissolved in glacial acetic acid on the high molecular acids of the oleic series are transformed into the salts of the alkaline earths. The preparation of these salts of the iodin derivatives of the high molecular fatty acids must be carried out in such a manner that the resulting salts are neutral, because salts containing free acids have a faint odor and taste and cannot be kept without decomposition. Under the term "high molecular acids of the oleic series" and "high molecular fatty acids" those acids are generally understood which contain more than about twelve carbon atoms in their molecule.

In order to produce my new substances—for example, the calcium salt of the monoiodobehenic acid—I can proceed as follows, the parts being by weight:

Example 1: Twenty parts of erucic acid and a solution of hydrogen iodid in glacial acetic acid, which is saturated at a low temperature and contains from ten to eleven parts of hydrogen iodid, are heated for about three to five days to from 60° to 70° centigrade in a closed vessel under constant stirring. The erucic acid remains undissolved for the most part, but nevertheless combines with hydrogen iodid. After cooling, the product of reaction is mixed with much water, and free iodin contained in it is removed by reduction with sulfurous acid. By cooling the liquid with ice the monoiodobehenic acid, which when first formed is an oil, solidifies. It is filtered off, dissolved in ether, and the ethereal solution is shaken with a highly-diluted sulfurous acid to remove free oidin. After evaporation of the ether the monoiodobehenic acid remains in the shape of a whitish solid substance. It melts at blood heat and has the formula $C_{22}H_{43}IO_2$. Twenty-five parts of crystallized chlorid of calcium containing water of crystallization are dissolved in one hundred and twenty parts of hot alcohol and an excess of gaseous ammonia is passed through the liquid. When the precipitation of ammonium chlorid has been completed, one hundred and thirty parts of alcohol (ninety-two per cent.) are added. It is then cooled to ordinary temperature. To the cold mixture a solution of forty-four parts of the above monoiodobehenic acid in one hundred and twenty parts of alcohol is slowly added under stirring. The calcium salt of monoiodobehenic acid separates out in the shape of a colorless voluminous precipitate. It is filtered off with suction, pressed, washed with alcohol, mixed up by stirring with cold water, filtered off with suction, and subsequently washed with water until the wash-water is free from chlorin. It is then washed with alcohol and dried *in vacuo*. The calcium salt thus obtained is a colorless and tasteless powder, almost insoluble in water and alcohol. It can be kept in the dark for a long time without suffering decomposition. In the light it slowly assumes a slightly-yellow color. It is formed according to the following equation:

$$2C_{22}H_{43}IO_2 + Ca(OH)_2 = (C_{22}H_{42}IO_2)_2Ca + 2H_2O.$$

Example 2: The same salt results by the interaction of an alkaline salt of monoiodobehenic acid with calcium salts in aqueous solution. For this purpose monoiodobehenic acid is dissolved in a somewhat larger quantity of caustic potash than is required by the acid by shaking it at ordinary temperature with highly-diluted caustic potash, (about one-fiftieth normal.) The calculated quantity of a dilute aqueous solution of chlorid of calcium is added to the solution and it is stirred until the colorless flocculent precipitate has settled. It is filtered off with suction, washed with water, then with alcohol to remove small quantities of free iodobehenic acid which may be present, and dried *in vacuo*. This purification is not necessary if an aqueous solution of chlorid of calcium mixed with an excess of ammonia be used. The precipitated calcium salt of iodobehenic acid is neutral and forms after being washed with water and dried *in vacuo* a white tasteless and odorless powder.

Example 3: The same salt may also be prepared as follows: One part of iodobehenic acid is shaken at ordinary temperature and for three to five days with one hundred parts of a saturated aqueous solution of calcium hydroxid. It is filtered off and washed with water. The resulting calcium salt, which still contains small amounts of the free acid, is then heated with alcohol to melt it and carefully mixed up with the liquid by stirring. After cooling, the salt forms a colorless powder which is filtered off and dried *in vacuo*.

Example 4: In order to prepare the strontium salts of monoiodobehenic acid, I may proceed as follows: Forty-four parts of crystallized strontium chlorid containing water of crystallization are dissolved in sixty parts of hot water, twelve hundred parts of methylic alcohol are added thereto, and an excess of gaseous ammonia is passed through the liquid. A solution of one hundred parts of iodobehenic acid in eight hundred parts of methylic alcohol is then slowly run into the above solution containing the strontium compound while constantly stirring. The precipitated strontium salt is filtered off, washed with methylic alcohol, then with water, and finally again with methylic alcohol, and dried *in vacuo*. It is a granular, colorless, tasteless, and odorless powder.

Example 5: The same salt results if I proceed as follows: Monoiodobehenic acid is dissolved by shaking it with a little more than the calculated quantity of one-fiftieth normal aqueous caustic-potash solution. A dilute aqueous solution of chlorid of strontium of a strength which is equivalent to the potash is added while vigorously stirring. The precipitate is then further treated as described under Example 2.

Example 6: The strontium salt may also be obtained as follows: A solution of four parts of crystallized strontium hydroxid in five hundred parts of water is allowed to flow on ten parts of iodobehenic acid. It is heated to about 35° centigrade until the acid melts, and the mixture is then vigorously stirred for about seventy to one hundred hours. It is advantageous to heat from time to time to 35° centigrade to melt the acid which has not taken part in the reaction. To separate the resulting strontium salt from admixed small amounts of unchanged acid, it is filtered off and heated with alcohol until it melts. The salt solidifies while cooling to a solid compound containing 24.2 per cent. of iodin. A solution of iodobehenic acid in ether or ligroin may also be used for the preparation of the strontium salt. The monoiodostearic acid is obtained from oleic acid in the same manner as the iodobehenic acid from erucic acid. It is advantageous for the preparation of the monoiodostearic acid to employ a somewhat larger quantity of hydrogen iodid on account of the smaller molecular weight of oleic acid. The iodostearic acid thus obtained is at ordinary temperature a faint yellow oil.

Example 8: The process for preparing the calcium salt of iodostearic acid is the same as is described under Example 1 for the preparation of the calcium salt of iodobehenic acid. After having washed with water the calcium salt it is advisable to extract it with acetone instead of with alcohol. By this treatment it loses its viscosity and is converted into a colorless and tasteless powder.

Example 9: The calcium salt of iodostearic acid may also be obtained as follows: A solution of iodostearic acid in a little more than the calculated quantity of dilute caustic potash is mixed while shaking with a dilute solution of chlorid of calcium, the strength of which is equivalent to the alkali. The precipitate obtained is filtered off with suction, washed with water, and dried *in vacuo*. Slight quantities of free iodostearic acid being sometimes contained in the product are got rid of by washing it with acetone.

Example 10: The strontium salt of iodostearic acid is prepared in the way described under Example 9 for the calcium salt, employing a solution of chlorid of strontium instead of calcium chlorid. After the washing with water it is advisable to carefully extract the salt with acetone. It is after being dried *in vacuo* a colorless, tasteless, and voluminous powder. The preparation of other monoiodin substituted derivatives of high molecular fatty acids and their salts of alkaline earths and of magnesium is carried out in an analogous manner. Brassidic acid, elaidic acid, or the like may be employed.

Having now described my invention and in what manner the same is to be performed, what I claim as new, and desire to secure by Letters Patent, is—

1. The herein-described salts of the alkaline earths of the monoiodin-substituted derivatives of high molecular fatty acids obtained from the corresponding high molecular acids of the oleic series which are solid, stable bodies, tasteless, colorless, and insoluble in water, substantially as hereinbefore described.

2. The herein-described salts of the alkaline earths obtained from monoiodobehenic acid which are solid stable bodies, tasteless, colorless and insoluble in water, substantially as hereinbefore described.

3. The herein-described calcium salt of monoiodobehenic acid $(C_{22}H_{42}IO_2)_2Ca$ obtained from monoiodobehenic acid which is a solid stable body, tasteless, colorless and insoluble in water.

In testimony whereof I have signed my name in the presence of two subscribing witnesses.

EMIL FISCHER

Witnesses:
HENRY HASPER,
WOLDEMAR HAUPT.

---

Corrections in Letters Patent No. 839,569.

It is hereby certified that in Letters Patent No. 839,569, granted December 25, 1906, upon the application of Emil Fischer, of Berlin, Germany, for an improvement in "Iodin Preparations," errors appear requiring correction, as follows: On page 1, line 74, the word "oidin" should read *iodin;* page 2, lines 80–81, the words "The monoiodostearic" should commence a new paragraph, and same page, line 119, the words "The preparation of" should commence a new paragraph; and that the said Letters Patent should be read with these corrections therein that the same may conform to the record of the case in the Patent Office.

Signed and sealed this 15th day of January, A. D., 1907.

[SEAL.]

F. I. ALLEN,
*Commissioner of Patents.* rivatives of high molecular fatty acids obtained from the corresponding high molecular acids of the oleic series which are solid, stable bodies, tasteless, colorless, and insoluble in water, substantially as hereinbefore described.

2. The herein-described salts of the alkaline earths obtained from monoiodobehenic acid which are solid stable bodies, tasteless, colorless and insoluble in water, substantially as hereinbefore described.

3. The herein-described calcium salt of monoiodobehenic acid $(C_{22}H_{42}IO_2)_2Ca$ obtained from monoiodobehenic acid which is a solid stable body, tasteless, colorless and insoluble in water.

In testimony whereof I have signed my name in the presence of two subscribing witnesses.

EMIL FISCHER

Witnesses:
HENRY HASPER,
WOLDEMAR HAUPT.

---

It is hereby certified that in Letters Patent No. 839,569, granted December 25, 1906, upon the application of Emil Fischer, of Berlin, Germany, for an improvement in "Iodin Preparations," errors appear requiring correction, as follows: On page 1, line 74, the word "oidin" should read *iodin;* page 2, lines 80–81, the words "The monoiodostearic" should commence a new paragraph, and same page, line 119, the words "The preparation of" should commence a new paragraph; and that the said Letters Patent should be read with these corrections therein that the same may conform to the record of the case in the Patent Office.

Signed and sealed this 15th day of January, A. D., 1907.

[SEAL.]

F. I. ALLEN,
*Commissioner of Patents.*

It is hereby certified that in Letters Patent No. 839,569, granted December 25, 1906, upon the application of Emil Fischer, of Berlin, Germany, for an improvement in "Iodin Preparations," errors appear requiring correction, as follows: On page 1, line 74, the word "oidin" should read *iodin;* page 2, lines 80-81, the words "The monoiodostearic" should commence a new paragraph, and same page, line 119, the words "The preparation of" should commence a new paragraph; and that the said Letters Patent should be read with these corrections therein that the same may conform to the record of the case in the Patent Office.

Signed and sealed this 15th day of January, A. D., 1907.

[SEAL.]

F. I. ALLEN,
*Commissioner of Patents.*